Patented Nov. 3, 1936

2,059,380

UNITED STATES PATENT OFFICE 2,059,380

COLORLESS ORGANIC DERIVATIVES OF CELLULOSE

Herbert E. Martin, Cumberland, Md., assignor to Celanese Corporation of America, a corporation of Delaware No Drawing. Application March 2, 1934, Serial No. 713,691

2 Claims. (Cl. 260—102)

This invention relates to the treatment of organic derivatives of cellulose, such as the organic esters of cellulose, to remove therefrom metallic compounds and opaque or other color imparting compounds, thus producing an organic derivative of cellulose that may be formed into filaments, films and molded articles that are clear, transparent and colorless even when they are of great thickness.

An object of the invention is the economic and expeditious production of organic derivatives of cellulose that are colorless and free from haze and that are especially adapted to the formation of base films for photography and such uses and also as a binding material or sheet in the manufacture of shatterproof glass. Other objects of the invention will appear from the following detailed description.

In the production of organic derivatives of cellulose there are produced metallic compounds and other haze forming compounds that are separated from the derivatives of cellulose if at all only by elaborate and expensive treatments. By this invention, however, the organic derivative of cellulose bleached or unbleached is economically treated with an agent that tends to remove metallic compounds and other haze forming compounds. The treatment with this reagent is simple and inexpensive as well as rapid. The treatment is sufficiently effective to form an organic derivative of water of white color that does not contain or form cloudy spots upon being subjected to bright light and high temperatures.

According to this invention I treat previously bleached or unbleached organic derivatives of cellulose in the cold with a very dilute solution of an alkaline cyanide such as sodium cyanide, potassium cyanide or ammonium cyanide. This treatment may be in the form of a spray or a bath. After this treatment the derivative of cellulose is washed and is found to be colorless and substantially free from metallic compound such as the copper and iron compounds that are greatly responsible for the formation of cloudy spots and the development of color in formed sheets and films.

This invention is applicable to the treatment of any organic derivative of cellulose such as the organic esters and ethers or mixed esters and ethers of cellulose. Examples of organic esters of cellulose are cellulose acetate, cellulose formate, cellulose propionate and cellulose butyrate while examples of organic ethers of cellulose are methyl cellulose, ethyl cellulose and benzyl cellulose.

The organic esters of cellulose that lend themselves to this invention may be made by any of the common methods now employed to make same. For example, cellulose (cotton linters, cotton, wood pulp, etc.) with or without a pretreatment in organic acids such as acetic acid and formic acid is esterified by treating same with an acid anhydride in the presence of an acid solvent and a catalyst. In place of the acid solvent or in connection therewith there may be used suspension liquids such as benzol. The acid solvent may be the concentrated acid corresponding to the anhydride employed or it may be, as is preferred, glacial acetic acid. Examples of catalyst are sulphuric acid, phosphorous acid, hydrochloric acid, zinc chloride and mixtures of these.

After esterification, sufficient water may be added to convert any remaining anhydride to the corresponding acid and the mixture is hydrolized or ripened until the desired solubility characteristics are developed. The catalyst is then neutralized and water or other non solvent for the ester added to precipitate the ester. The ester is then separated and washed free of the acid solution. The cellulose ester may then be stabilized by treating with boiling water containing small amounts of mineral acid or with steam with or without pressure. During this stabilizing, the cellulose ester develops considerable color. I have found that if the metallic compounds, the exact chemical structure of which is unknown, and other haze-forming compounds are removed prior to stabilization that no color develops either during stabilization or after complete processing even though the cellulose ester be later subjected to strong light and high temperature. I have found that these compounds may be removed, or diminished to below an effective quantity, by soaking the unstabilized ester in an alkali cyanide. I have also found that by treating cellulose esters after stabilization with an alkali cyanide any color that has developed is removed and the metallic compounds are diminished to below an effective quantity such that no further color or haze will be developed. The color of the resulting product is water white and unbleached esters of cellulose treated accordingly are as colorless as esters of cellulose that have been bleached by treatment with chlorine or solution of metallic hypochlorites.

This invention is of great advantage in forming colorless cellulose esters where it is undesirable to use thereon chlorine bleaching agents. A further reduction in color is possible by first bleaching the cellulose ester by treatment with chlorine or solutions of the hypochlorites of sodium, potassium or calcium and then treating same with a solution of an alkali cyanide. This latter procedure is preferred only on charges that are of high copper content and otherwise of high color.

To further describe the invention and not as a limitation the following examples are given.

*Example I*

A charge of cellulose acetate that has been stabilized and bleached with chlorine or an aqueous solution of a hypochlorite either before or after stabilization and still retains a light greenish cast is treated for 2 hours at room temperature or below with a 0.04% sodium cyanide water solution. The cellulose acetate is then washed free of sodium cyanide.

The product is found to be colorless and films made therefrom do not develop color or haze upon subjecting them to long periods of bright light and high heat. The original material contained over 40 parts per million of copper while the treated material contained less than five parts per million copper. The temperature of decomposition is raised from 233° C. to 240° C.

*Example II*

125 parts of unbleached, precipitated cellulose acetate is treated for 2 hours at room temperature or below with about 750 parts of a 0.04% sodium cyanide water solution. The cellulose acetate is then washed free of sodium cyanide and the treatment again repeated for one hour.

The color on the sodium cyanide metallic compound extracted material is substantially as good as on the bleached and then extracted material of Example I, and films made therefrom do not develop color.

Any of the alkali cyanides may be employed with or in place of the sodium cyanide with similar results.

Having described my invention what I desire to secure by Letters Patent is:

1. Process for the decoloration of organic acid derivatives of cellulose which have been stabilized and bleached, which comprises treating said derivatives of cellulose with an aqueous solution of an alkaline cyanide for two hours at substantially room temperature and then washing the treated materials free from the metal cyanide compounds formed and until the undesirable color is removed.

2. Process for the decoloration of cellulose acetate which has been stabilized and bleached, which comprises treating the said cellulose acetate with an aqueous solution containing 0.04% of sodium cyanide, for two hours at substantially room temperature and then washing the treated cellulose acetate free from metal cyanide compounds formed and until the undesirable color is removed.

H. E. MARTIN.